United States Patent
Bugada et al.

(10) Patent No.: US 6,476,135 B1
(45) Date of Patent: Nov. 5, 2002

(54) POLYOLEFIN COMPOSITION CONTAINING LOW VISCOSITY PROPYLENE HOMOPOLYMER, FIBER AND EXTENSIBLE NON-WOVEN FABRIC PREPARED THEREFROM

(75) Inventors: Daniele C. Bugada, Newark, DE (US); Michael E. Starsinic, Williamsport, MD (US)

(73) Assignee: Basell Poliolefine Italia S.p.A., Milan (IT)

( * ) Notice: Subject to any disclaimer, the term of this patent is extended or adjusted under 35 U.S.C. 154(b) by 152 days.

(21) Appl. No.: 09/589,472

(22) Filed: Jun. 7, 2000

(51) Int. Cl.$^7$ ............................ C08L 23/00; C08L 23/04

(52) U.S. Cl. ........................................ 525/191; 525/240

(58) Field of Search .................................. 525/191, 240

(56) References Cited

U.S. PATENT DOCUMENTS

| | | | |
|---|---|---|---|
| 5,460,884 A | 10/1995 | Kobylivker et al. | 428/373 |
| 5,529,845 A | 6/1996 | Branchesi et al. | 428/359 |
| 5,529,850 A | 6/1996 | Morini et al. | 428/500 |

FOREIGN PATENT DOCUMENTS

| | | |
|---|---|---|
| EP | 0942021 | 9/1999 |
| EP | 1059332 | 12/2000 |
| WO | 9914261 | 3/1999 |

*Primary Examiner*—Nathan M. Nutter

(57) ABSTRACT

A polyolefin composition which contains 45 to 5 weight percent of a low viscosity propylene homopolymer having an as polymerized melt flow rate of 250 to 550 g/10 minutes and 55 to 95 weight percent of an olefin polymer composition, preferably a random copolymer of propylene and ethylene and/or a $C_{4-10}$ alpha-olefin or mixtures thereof, containing from 90 to 99 weight percent propylene. The composition may be formed into fibers having a diameter of from 15 to 23 microns. The fibers may be used to produce nonwoven fabrics.

7 Claims, No Drawings

POLYOLEFIN COMPOSITION CONTAINING LOW VISCOSITY PROPYLENE HOMOPOLYMER, FIBER AND EXTENSIBLE NON-WOVEN FABRIC PREPARED THEREFROM

BACKGROUND OF THE INVENTION

The present invention relates to a polyolefin composition containing a crystalline propylene homopolymer having a high melt flow rate, and an olefin polymer composition, as well as fiber and nonwoven fabric prepared therefrom. Nonwoven fabrics prepared from fibers of this polyolefin composition exhibit a desirable combination of acceptable tensile strength, superior cross-directional fabric elongation, good processability, and improved fabric softness and drape.

U.S. Pat. No. 5,460,884 discloses a nonwoven fabric prepared from a polyolefin composition having a highly crystalline propylene homopolymer as a major component and a heterophasic ethylene/propylene random copolymer as a minor component. The nonwoven fabric is said to be very strong but yet soft in comparison to comparable nonwoven fabrics.

Nonwoven fabrics have gained acceptance in various products, including diapers, disposable medical products and personal hygiene products. Nonwoven fabrics destined for use in these applications may be subjected to post-manufacturing finishing operations such as coating or stretching. Fabrics having high tensile strength can be difficult to process, and also may exhibit inadequate suppleness ("drape") as well as reduced fabric elongation.

Nonwoven fabrics prepared from polyolefin fibers having a high melt flow rate have been proposed. Thus, U.S. Pat. No. 5,529,850 discloses fibers and nonwoven fabrics produced from crystalline propylene polymers and copolymers having a polydispersity index of 2.5 to 3.7 and a melt flow rate of from 600 to 2000 g/10 minutes.

An object of this invention is to provide a polyolefin composition capable of being formed into fibers of fine diameter.

Another object of this invention is to provide a polyolefin fiber capable of being formed into a nonwoven fabric having a combination of desirable properties, including acceptable tensile strength, superior cross-directional fabric elongation, good processability, and improved fabric softness and drape.

A feature of this invention is a polyolefin composition which includes an as-polymerized, high melt flow rate (MFR) propylene homopolymer and a random copolymer of propylene and ethylene and/or a $C_{4-10}$ alpha-olefin.

Another feature of this invention is a fiber prepared from this polyolefin composition and which has a diameter of from 15 to 23 microns.

Yet another feature of this invention is a nonwoven fabric prepared from this polyolefin fiber and which has superior cross-directional fabric elongation, as measured by peak tensile elongation.

An advantage of the nonwoven fabric of the present invention is that it has improved processability, softness and drape.

SUMMARY OF THE INVENTION

The present invention relates to a polyolefin composition comprising:

A. 45 to 5 weight percent of a low viscosity propylene homopolymer having an as polymerized MFR of from 250 to 550 g/10 minutes, as measured by D-1238, Condition L (230° C./2.16 Kg); and B. 55 to 95 weight percent of an olefin polymer composition selected from the group consisting of
  (1) a random copolymer of propylene and ethylene and/or a $C_{4-10}$ alpha-olefin, with the copolymer containing from 90 to 99 weight percent propylene;
  (2) a propylene polymer composition consisting essentially of:
    (a) from 30 to 65% of a copolymer of propylene with a $C_{4-8}$ alpha-olefin, which contains from 80 to 98% propylene, and
    (b) from about 35 to 70% of a copolymer of propylene with ethylene having an ethylene content of from 1 to 10% or a terpolymer of propylene with ethylene and a $C_{4-8}$ alpha-olefin having a total comonomer content is from 2 to 10%;
  (3) an olefin polymer composition consisting essentially of:
    (a) from 10 to 50% of a propylene homopolymer having an isotactic index of from 80 to greater than 99%, or a copolymer selected from the group consisting of (i) propylene and ethylene, (ii) propylene, ethylene and a $CH_2=CHR$ alpha-olefin, where R is a $C_{2-8}$ straight or branched alkyl, and (iii) propylene and a $CH_2=CHR$ alpha-olefin, where R is a $C_{2-8}$ straight or branched alkyl, wherein said copolymer contains from 85 to 99% propylene, and having an isotactic index greater than 80 to 98%,
    (b) from 5 to 20% of a semi-crystalline, essentially linear copolymer fraction having a crystallinity of about 20 to 60%, by differential scanning calorimetry (DSC), wherein the copolymer is selected from the group consisting of (i) ethylene and propylene containing over 55% ethylene; (ii) ethylene, propylene, and a $CH_2=CHR$ alpha-olefin, where R is a $C_{2-8}$ straight or branched alkyl, containing from 1 to 10% of the alpha-olefin and over 55% up to 98% of both ethylene and alpha-olefin; and (iii) ethylene and a $CH_2=CHR$ alpha-olefin, where R is a $C_{2-8}$ straight or branched alkyl, containing over 55% up to 98% of said alpha-olefin, which copolymer is insoluble in xylene at room or ambient temperature, and
    (c) from 40 to 80% of a copolymer fraction selected from the group consisting of a copolymer of (i) ethylene and propylene wherein the copolymer contains from 20% to less than 40% ethylene; (ii) ethylene, propylene, and a $CH_2=CHR$ alpha-olefin, where R is a $C_{2-8}$ straight or branched alkyl, wherein the alpha-olefin is present in an amount of from 1 to 10% and the amount of ethylene and alpha-olefin present is from 20% to less than 40%; and (iii) ethylene and a $CH_2=CHR$ alpha-olefin, where R is a $C_{2-8}$ straight or branched alkyl, containing from 20 to less than 40% of the alpha-olefin, and optionally with 0.5 to 10% of a diene, said copolymer fraction being soluble in xylene at ambient temperature, and having an intrinsic viscosity of from 1.7 to 3.0 dl/g, wherein the total amount of ethylene units or said alpha-olefin units in the olefin polymer composition, or of ethylene and said alpha-olefin units when both are present in the olefin polymer composition is from 15 to 35%, the total amount of (b) and (c) fractions, based on the total olefin polymer composition is from about 65% to 80%, the weight ratio of (b)/(c) is from 0.1 to about 0.3 and the total content of ethylene or $C_{4-8}$ alpha-olefin or combination thereof in (b+c) is less than 50%;

(4) a thermoplastic olefin composition consisting essentially of:
  (a) from 10 to 60% of a propylene homopolymer having an isotactic index greater than 90 or a crystalline propylene copolymer with ethylene and/or $C_{4-8}$ alpha-olefin having a propylene content greater than 85% and an isotactic index of greater than 85%;
  (b) from 30 to 60% of an amorphous ethylene-propylene copolymer fraction, optionally containing minor amount of a diene, which is xylene soluble at room temperature, and contains from 40 to 70% ethylene; and
  (c) from 8 to 40% of a semi-crystalline ethylene-propylene copolymer which is xylene insoluble at room temperature, (5) a linear low density polyethylene containing up to 20%, by weight, of a $C_{4-8}$ α-olefin having a density of from 0.88 to 0.945 g/cm³ and a melt index of from 0.1 to 35 g/10 min;

(6) a high melt strength propylene polymer having a branching index of less than 0.9 or a melt tension of 3 to 28 cN; and (7) mixtures thereof.

The present invention also relates to fibers prepared from this polyolefin composition, with the fibers having a diameter of from 15 to 23 microns.

In another embodiment, the present invention is a nonwoven fabric prepared from fibers made from the polyolefin composition.

DETAILED DESCRIPTION OF THE PREFERRED EMBODIMENTS

The polyolefin composition of the present invention contains from 5 to 45, preferably 5 to 40, and most preferably 10 to 40, weight percent of a low viscosity propylene homopolymer. The propylene homopolymer may be prepared by polymerization of propylene using known Ziegler-Natta catalyst systems and according to known methods operating in liquid phase comprising the propylene monomer or a solution thereof, in an aliphatic or aromatic hydrocarbon solvent, or in gas phase, or combining liquid and gas polymerization steps.

The polyolefin composition of the present invention also contains from 55 to 95, preferably 60 to 95 weight percent, and most preferably from 60 to 90 weight percent of an olefin polymer composition B, which may be any one of several olefin compositions B(1) through B(5) or mixtures thereof. The olefin polymer composition is preferably B(1), a random copolymer of propylene and ethylene and/or a $C_{4-10}$ alpha-olefin. The random copolymer contains from 90 to 99, preferably from 95 to 98, most preferably from 96.5 to 99, weight percent propylene, with the balance being ethylene, a $C_{4-10}$ alpha-olefin, a mixture of both ethylene and a $C_{4-10}$ alpha-olefin or a mixture of $C_{4-10}$ alpha-olefins. Examples of random copolymers that can be used as olefin polymer composition B(1) include propylene/ethylene, propylene/1-butene, propylene/1-pentene, propylene/1-octene and propylene/ethylene/1-butene copolymers.

The random copolymer may be prepared from the respective monomers by conventional copolymerization using conventional apparatus and techniques well known to those of ordinary skill in the art. Random copolymers of propylene and ethylene with or without 1-butene are commercially available from companies such as Montell USA, Inc.

The random copolymer has a MFR of at least 10, preferably 10 to 40, g/10 minutes, as measured according to D-1238, Condition L (230° C./2.16 Kg.). These melt flow rate values may be obtained directly in polymerization, or by visbreaking.

The olefin polymer composition may alternatively be B(2), a propylene polymer composition consisting essentially of:
  (a) from 30 to 65%, preferably from about 45 to 65%, of a copolymer of propylene with a $C_{4-8}$ alpha-olefin, which contains from 80 to 98% propylene, and preferably from 85 to 95%, and
  (b) from about 35 to 70%, preferably from about 35 to 55%, of a copolymer of propylene with ethylene having an ethylene content of from 1 to 10%, preferably from 7 to 9%, or a terpolymer of propylene with ethylene and a $C_{4-8}$ alpha-olefin having a total comonomer content, i.e., of ethylene and a $C_{4-8}$ alpha-olefin, is from 2 to 10%, preferably 3 to 6%, and the ethylene content is preferably from 1 to 3%.

The olefin polymer composition may alternatively be B(3), which consists essentially of:
  (a) from 10 to 50% of a propylene homopolymer, preferably from 10 to 40%, and most preferably from 20 to 35%, having an isotactic index of from 80 to greater than 99%, preferably from 85 to 99%, or a copolymer selected from the group consisting of (i) propylene and ethylene, (ii) propylene, ethylene and a $CH_2=CHR$ alpha-olefin, where R is a $C_{2-8}$ straight or branched alkyl, and (iii) propylene and a $CH_2=CHR$ alpha-olefin, where R is a $C_{2-8}$ straight or branched alkyl, wherein said copolymer contains from 85 to 99%, and preferably from 90 to 99% propylene and having an isotactic index greater than 80 to 98%, preferably greater than 85 to 98%,
  (b) from 5 to 20% of a semi-crystalline, essentially linear copolymer fraction, preferably from 7 to 15%, having a crystallinity of about 20 to 60%, by differential scanning calorimetry (DSC), wherein the copolymer is selected from the group consisting of (i) ethylene and propylene containing over 55% ethylene; (ii) ethylene, propylene, and a $CH_2=CHR$ alpha-olefin, where R is a $C_{2-8}$ straight or branched alkyl, containing from 1 to 10% of the alpha-olefin and over 55% up to 98%, preferably from 80 to 95%, of both ethylene and alpha-olefin; and (iii) ethylene and a $CH_2=CHR$ alpha-olefin, where R is a $C_{2-8}$ straight or branched alkyl, containing over 55% up to 98%, preferably from 80 to 95%, of said alpha-olefin, which copolymer is insoluble in xylene at room or ambient temperature, and
  (c) from 40 to 80% of a copolymer fraction, preferably 50 to 70%, selected from the group consisting of a copolymer of (i) ethylene and propylene wherein the copolymer contains from 20% to less than 40%, preferably from 20 to 38%, most preferably 25 to 38% ethylene; (ii) ethylene, propylene, and a $CH_2=CHR$ alpha-olefin, where R is a $C_{2-8}$ straight or branched alkyl, wherein the alpha-olefin is present in an amount of from 1 to 10%, preferably from 1 to 5%, and the amount of ethylene and alpha-olefin present is from 20% to less than 40%; and (iii) ethylene and a $CH_2=CHR$ alpha-olefin, where R is a $C_{2-8}$ straight or branched alkyl, containing from 20 to less than 40%, preferably 20 to 38%, and most preferably 25 to 38% of the alpha-olefin, and optionally with 0.5 to 10%, preferably 1 to 5% of a diene, said copolymer fraction being soluble in xylene at ambient temperature, and having an intrinsic viscosity preferably of from 1.7 to 3.0 dl/g, wherein the total amount of ethylene units or said alpha-olefin units in the olefin polymer composition, or of ethylene and said alpha-olefin units when both are present in the olefin polymer composition is from 15 to 35%, the total amount of (b) and (c) fractions, based on the total olefin polymer composition is preferably from about 65% to 80%, the weight ratio of (b)/(c) is preferably from 0.1 to about 0.3 and the total content of ethylene or $C_{4-8}$ alpha-olefin or combination thereof in (b+c) is less than 50%, and preferably from 20 to 45%.

The olefin polymer composition may alternatively be B(4), a thermoplastic olefin composition consisting essentially of:

(a) from 10 to 60% of a propylene homopolymer, preferably from 20 to 50%, having an isotactic index greater than 90, preferably greater than 98%, or a crystalline propylene copolymer with ethylene and/or $C_{4-8}$ alpha-olefin having a propylene content greater than 85% and an isotactic index of greater than 85%;

(b) from 30 to 60% of an amorphous ethylene-propylene copolymer fraction, preferably from 30 to 50%, optionally containing minor amount of a diene, which is xylene soluble at room temperature, and contains from 40 to 70% ethylene; and (c) from 8 to 40% of a semi-crystalline ethylene-propylene copolymer which is xylene insoluble at room temperature.

The olefin polymer composition may alternatively be B(5), a linear low density polyethylene containing up to 20%, preferably 5 to 14% of a $C_{4-8}$ α-olefin. Preferably, said linear low density polyethylene has a density of from 0.89 to 0.94, and most preferably from 0.900 to 0.935 g/cm³. The melt index [ASTM D1238, Condition E (190° C./2.16 Kg)] is preferably from 0.20 to 33 g/10 min., and most preferably from 0.20 to 30 g/10 min.

The olefin polymer composition may alternatively be B(6), a high melt strength propylene polymer can be prepared from a propylene polymer using the irradiation process disclosed in U.S. Pat. No. 5,554,668, the disclosure of which is incorporated herein by reference or by the process disclosed in U.S. Pat. No. 5,047,485, the disclosure of which is incorporated by reference. Suitable propylene polymers include a homopolymer of propylene, a copolymer of propylene with ethylene or a $C_{4-10}$ α-olefin, a heterophasic or impact modified propylene polymer or mixtures thereof. Such propylene polymers are commercially available.

The branching index quantifies the degree of long chain branching present in the high melt strength propylene homopolymer. It is defined by the equation:

$$g' = \frac{[IV]_{Br}}{[IV]_{Lin}}$$

in which g' is the branching index, $[IV]_{Br}$ is the intrinsic viscosity of the branched propylene polymer and $[IV]_{Lin}$ is the intrinsic viscosity of the corresponding, linear propylene polymer of substantially the same molecular weight average molecular weight.

The melt tension of the second component is preferably 8 to 26 cN, more preferably 12 to 24 cN. Melt tension provides an indication of the melt strength of the material, and may be determined with a Gottfert Rheotens melt tension apparatus from Gottfert Inc. by measuring the tension of a strand of molten polymer in centi-Newtons as follows: the polymer to be examined is extruded at 180° C. through a capillary 20 mm long and 2 mm in diameter; the strand is then subjected to stretching using a drawing system with a constant acceleration of 0.3 cm/sec². The tension resulting from the above drawing is measured (in centi-Newtons). The higher the melt tension means the greater the melt strength values which, in turn, are indicative of the particular material's strain hardening ability.

The olefin polymer composition may alternatively be mixtures of B(1) through B(6).

Olefin polymer compositions B(2) through B(4) are disclosed in even greater detail in U.S. Pat. No. 5,508,318, the disclosure of which is incorporated by reference herein.

The olefin polymer composition B(5) is disclosed in greater detail in U.S. Pat. No. 5,455,303, the disclosure of which is incorporated by reference.

The catalysts that can be used to produce the polymer composition of the present invention are well known in patent literature. Particularly suited are the catalysts described in U.S. Pat. Nos. 4,339,054, 5,539,067 and 5,618,771. Other examples of catalysts are described in U.S. Pat. Nos. 4,472,524 and 4,473,660.

The above mentioned catalysts used in the polymerization comprise the product of the reaction between:

a) a solid component, containing a titanium compound and an electron-donor compound (internal electron donor) supported on magnesium chloride in active form, b) an aluminum alkyl compound (cocatalyst) and c) an electron-donor compound (external electron-donor).

These catalysts are preferably capable of producing propylene homopolymer having an isotactic index higher than 90%.

The solid catalyst component (a) contains as electron-donor a compound selected among the ethers, ketones, lactones, compounds containing N, P and/or S atoms, and mono- and dicarboxylic acid esters.

Suitable electron-donors for solid catalyst component (a) include monobenzyl monobutyl phthalate; malonic acid esters such as diisobutyl and diethyl malonate; alkyl and arylpivalates; alkyl, cycloalkyl and aryl maleates; alkyl and aryl carbonates such as diisobutyl carbonate, monoethyl monophenyl carbonate, and diphenyl carbonate; succinic acid esters such as mono- and diethyl succinate. Particularly suitable are phthalic acid esters such as diisopropyl, di-n-butyl, diisobutyl, di-n-pentyl, diisopentyl, dihexyl, diheptyl and dioctyl phthalate. Other electron-donors particularly suited are the 1,3-diethers of formula (I):

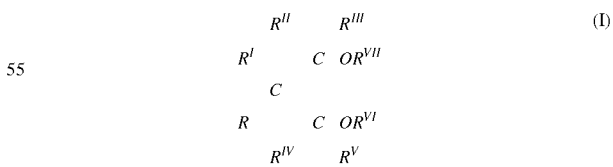

wherein R, $R^I$, $R^{II}$, $R^{III}$, $R^{IV}$ and $R^V$ are the same or different and are H, $C_{1-18}$ linear or branched alkyl, $C_{5-18}$ cycloalkyl, $C_{6-18}$ aryl, $C_{7-18}$ alkylaryl or $C_{7-18}$ arylaklyl radicals, provided that when R is H or alkyl, $R^I$ is other than H or alkyl and when $R^I$ is H or alkyl, R is other than H or alkyl; $R^{VI}$ and $R^{VII}$ are the same or different and are $C_{1-18}$ linear or branched alkyl, $C_{5-18}$ cycloalkyl, $C_{6-18}$ aryl, or $C_{7-18}$ arylaklyl radicals; and two or more of R $R^V$ may be bonded to form a cyclic structure having 5 to 18 carbon atoms. Illustrative examples of ethers whose structures conform to formula (I) include 2,2-diphenyl-1,3-dimethoxypropane, 2,2-dibenzyl-1,3-dimethoxypropane, 2,2-bis(cyclohexylmethyl) 1,3-dimethoxypropane, 1,3-bix(methoxymethyl)cyclohexane and 2,2'-bix(methoxymethyl)norbornane, 2-methyl-2-isopropyl-1,3-dimethoxypropane, 2,2-diisobutyl-1,3-dimethoxypropane, and 2-isopropyl-2-cyclopentyl-1,3-dimethoxy propane. The diethers of the type described are disclosed in U.S. Pat. No. 5,095,153, the disclosures of which are incorporated herein by reference.

The preparation of the described catalyst components is done according to various methods. One of them consists of milling or co-milling the magnesium dihalide (used in the anhydrous state containing less than 1% water), together with the titanium compound, and the electron-donor compound under conditions where the magnesium dihalide is activated; the milled product is then treated one or more times with excess $TiCl_4$ at temperatures from 80 to 135° C., and subsequently washed repeatedly with a hydrocarbon (hexane, for example) until the chlorine ions have disappeared from the wash waters. The electron-donor compound may also be added during the milling operation or during the treatment with excess $TiCl_4$. If more than one treatment with excess $TiCl_4$ is employed, the electron donor compound is added during the first treatment.

According to another method the anhydrous magnesium halide is preactivated according to known methods, and then treated one or more times with excess $TiCl_4$ containing the electron-donor compound in solution. In this case the operation also takes place at a temperature from 80 to 135° C. Optionally, the $TiCl_4$ treatment is repeated. The solid is then washed with hexane or other solvents to eliminate all traces of unreacted $TiCl_4$. The electron-donor compound may also be added during the treatment with excess $TiCl_4$, preferably during the first treatment, if more than one treatment with excess $TiCl_4$ is used.

According to another method, a $MgCl_2nROH$ adduct (particularly in the form of spherical particles) where n is generally a number ranging from 1 to 3 and ROH is ethanol, butanol or isobutanol, is treated one or more times with excess $TiCl_4$ containing the electron-donor compound in solution. The electron-donor compound may also be added during the treatment with excess $TiCl_4$, preferably during the first treatment, if more than one treatment with excess $TiCl_4$ is used. The reaction temperature generally ranges from 80 to 120° C. After the reaction the solid is isolated and treated one or more times with $TiCl_4$, and then washed with a hydrocarbon solvent until all traces of unreacted $TiCl_4$ have been eliminated.

According to yet another method, magnesium alcoholates and chloroalcoholates (the chloroalcoholates can be prepared according to U.S. Pat. No. 4,220,554) are treated one or more times with excess $TiCl_4$ containing the electron-donor compound in solution, operating under the same conditions already described. The electron-donor compound may also be added during the treatment with excess $TiCl_4$, preferably during the first treatment, if more than one treatment with excess $TiCl_4$ is used.

The titanium compound in the solid catalyst component, expressed as Ti content, is generally present in the amount ranging from 0.5 to 10% by weight, and the quantity of the electron-donor compound that remains set on the solid magnesium dihalide usually ranges from 5 to 20% in moles with respect to the magnesium dihalide.

Titanium compounds which can be used for the preparation of catalyst components are halides or halogen alcoholates. Titanium tetrachloride is the preferred compound. Satisfactory results are obtained also with titanium trihalides, particularly $TiCl_3HR$ (HR=Hydrogen Reduced), $TiCl_4ARA$ (ARA=Aluminum Reduced and Activated), and with titanium halide alcoholates such as $TiCl_3OR$, where R is a phenyl radical.

The preparations indicated above lead to the formation of activated magnesium dihalide. Besides the ones already mentioned, other reactions are known in the art which lead to the formation of activated magnesium dihalides starting from magnesium compounds which are different from the magnesium halides, such as magnesium carboxylates.

The active form of magnesium halides in the solid catalyst component can be recognized by the fact that in the X-ray spectrum of the catalyst component the major intensity reflection presents a width at half-peak at least greater than 30% with respect to the major intensity reflection which appears in the spectrum of the nonactivated magnesium dihalide, or by the fact that the major intensity reflection (which appears in the spectrum of the nonactivated magnesium halides, having a surface area smaller than 3 m²/g) is absent and in its place there is a halo with the maximum intensity shifted with respect to the position of the maximum intensity reflection of the nonactivated magnesium dihalide. The most active forms of magnesium halide are those where the X-ray spectrum shows a halo.

Among the magnesium dihalides, the magnesium chloride is the preferred compound. In the case of the most active forms of magnesium chloride, the x-ray spectrum of the catalyst component shows a halo instead of the reflection, which in the spectrum of the nonactivated magnesium chloride is situated at the distance of 2.56 Å.

As cocatalysts (b), one preferably uses the trialkyl aluminum compounds, such as Al-triethyl, Al-triisobutyl and Al-tri-n-butyl. Other examples of cocatalysts (b) are the linear or cyclic Al-alkyl compounds containing two or more Al atoms bonded by means of O, or N atoms, or by $SO_2$, $SO_3$ or $SO_4$ groups. Some examples of these compounds are;

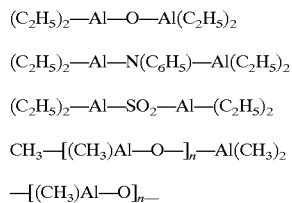

wherein n is a number from 1 to 20.

In general, the Al-Alkyl compound is present in quantities that allow the Al/Ti ratio to vary from 1 to 1000.

The electron-donor compounds (c) that can be used as external electron-donors comprise the aromatic acid esters (such as alkylic benzoates), heterocyclic compounds (such as the 2,2,6,6-tetramethylpiperidine and 2,6-diisopropylpiperidine), and in particular silicon compounds containing at least one Si—OR bond (where R is a hydrocarbon radical). Some examples of silicon compounds are: $(tert-C_4H_9)_2$ $Si(OCH_3)_2$ and $(C_6H_5)_2Si(OCH_3)_2$. Suitable silicon compounds are described in U.S. Pat. Nos. 5,539,067 and 5,618,771 and U.S. Ser. No. 08/469,735, the disclosures of which are incorporated herein by reference.

The 1,3-diethers of formula (I) are also suitable to be used as external donors. In the case that the internal donor is one of the 1,3-diethers of formula (I), the external donor can be omitted.

The catalysts can be precontacted with small quantities of olefins (prepolymerization), maintaining the catalyst in suspension in a hydrocarbon solvent, and polymerizing at temperatures ranging from ambient to 60° C. The quantity of polymer produced is from 0.5 to 3 times the weight of the catalyst.

The prepolymerization can also be carried out in liquid propylene under the temperature conditions indicated above, and can produce quantities of polymer that can reach up to 1000 g per gram of catalyst component.

The propylene homopolymer has a MFR of from 250 to 550, preferably 350 to 450, and most preferably 380 to 420 g/10 minutes, as measured by ASTM D-1238, Condition L (230° C./2.16 Kg) These MFR values are obtained directly in polymerization ("as polymerized"), and not by post-polymerization (visbreaking) techniques well known to those of ordinary skill in this art.

Propylene homopolymers suitable for use in the present invention are commercially available from Montell USA Inc.

The polyolefin composition of the present invention may be prepared by mixing together the olefin polymer composition and propylene homopolymer using conventional techniques and apparatus well known to those of ordinary skill in the art. For example, the two components may be mixed together in a mixer, and extruded into pellets using a single screw conventional extruder operated at conventional temperatures and mixing speeds.

The polyolefin composition has a MFR of 20 to 70 g/10 minutes, preferably 25 to 65 g/10 minutes, as measured according to D-1238, Condition L (230° C./2.16 Kg)

The molecular weight distribution of a polymer (MWD) is defined as the weight average molecular weight (Mw) divided by the number average molecular weight (Mn).

The polyolefin composition of the present invention typically has a polydispersity index of from 3.0 to 4.5, preferably from 3.3 to 3.7, and most preferably from 3.5 to 3.7. Polydispersity Index (P.I.) is a parameter obtained by way of rheologic measurement, and which is correlated to the polymer's molecular weight distribution. In particular, the lower the P.I., the narrower the MWD.

The polyolefin composition preferably includes one or more organic phosphites and/or phosphonites, one or more HALS (Hindered Amine Light Stabilizer) and one or more phenolic antioxidants. Specific examples of phosphites include tris(2,4-di-tert-butylphenyl)phosphite marketed by Ciba Specialty Chemicals Corp. under the trademark Irgafos 168; distearyl pentaerythritol diphosphite marketed by GE Specialty Chemicals under the trademark Weston 618; 4,4'-butylidenebis(3-methyl-6-tert-butylphenyl-di-tridecyl) phosphite marketed by Ashasi Denka under the trademark ADK Stab P; tris(monononylphenyl)phosphite; bis(2,4-di-tert-butyl)pentaerythritol diphosphite, marketed by GE Specialty Chemicals under the trademark Ultranox 626.

HALS are monomeric or oligomeric compounds containing in the molecule one or more substituted amine, preferably piperidine, groups. Specific examples of HALS containing substituted piperidine groups are the compounds sold by Ciba Specialty Chemicals Corp. under the following trademarks: Chimassorb 944; Tinuvin 770, Tinuvin 765, Tinuvin 622, Tinuvin 144, and the product sold by Cytec Industries Inc. under the trademark Cyasorb UV 3346.

Illustrative examples of phenolic antioxidants include tris-(4-tert-butyl-3-hydroxy-2,6-dimethylbenzyl)-s-triazine-2,4,6-(1H,3H,5H)trione; calcium bi[monoethyl(3,5-di-tert-butyl-4-hydroxy-benzyl)phosphonate]; 1,3,5-tris(3,5-di-tert-butyl-4-hydroxybenzyl)-s-triazine-2,4,6(1H,3H,5H) trione; 1,3,5-trimethyl-2,4,6-tris(3,5-di-tert-butyl-4-hydroxybenzyl)benzene; pentaerythrityl-tetrakis[3-(3,5-di-tert-butyl-4-hydroxyphenyl)propionate]; octadecyl-3-(3,5-di-tert-butyl-4-hydroxyphenyl)propionate; and 2,6-dimethyl-3-hydroxy-4-tert-butylbenzyl abietate.

A preferred stabilizer package comprises 200–400 ppm Irgafos 168 tris(2,4-di-tert-butylphenyl)phosphite; 200–400 ppm Tinuvin 622 poly(N-beta-hydroxymethyl-2,2,6,6-tetramethyl-4-hydroxy-piperidyl succinate) hindered amine light stabilizer; and 200–400 ppm calcium stearate. These stabilizers can be added to the polyolefin composition by means of an extruder with subsequent pelletization or surface coating, or they can be mechanically mixed with the polyolefins.

Other additives conventionally used in the production of continuous polymer filaments can also be incorporated in the polyolefin polymer composition such as UV stabilizers, pigments, delusterants, lubricants, antistatic agents, water and alcohol repellents, etc. in conventional amounts, which are typically no more than about 10% by weight.

The polyolefin composition of the present invention may be manufactured into fibers and films using conventional techniques and apparatus well known to those of ordinary skill in the art. Thus, for example, the composition may be extruded through a spinnerette into a fiber or filament which is then oriented and quenched prior being wound onto a bobbin. Alternatively, the extruded fiber may be immediately formed into a non-woven fabric using known techniques such as spunbonding, meltblowing, needlepunching, air-layering etc. The term "nonwoven fabric" means a web having a structure of individual fibers or threads which are interlaid, but not in a regular, repetitive manner as in a knitted fabric. The fibers of the present invention have particular utility as starting materials for the production of nonwoven fabrics.

Fibers prepared from the composition of the present invention typically have a fiber diameter of from 15 to 23 microns, preferably 16 to 17.5 microns, and most preferably 16 to 17 microns.

The spunbond process generally uses a hopper which supplies polymer to a heated extruder, which supplies molten polymer to a spinnerette where the polymer is formed into a plurality of filaments by passing it through the holes of the spinnerette. The filaments are usually quenched with air at a low pressure, drawn, usually pneumatically, and deposited on a moving foraminous mat, belt or "forming wire" to form the nonwoven fabric. Spunbonding processing temperatures generally range from about 175° C. to 320° C.

"Cross-directional peak elongation" is the fabric elongation when fabric strength is at its peak. "Cross directional elongation" is the maximum elongation at which the fabric fails. CD elongation is higher than CD peak elongation.

At a given fiber diameter, fabric elongation will generally be highest when the fabric is bonded at the optimum bonding temperature. Fabric elongation decreases with a decrease in fabric weight.

The nonwoven fabrics of the present invention have superior cross-directional fabric elongation, as measured by peak tensile elongation, and relatively low tensile strength. Thus, the nonwoven fabrics of the present invention preferably have a peak tensile elongation of at least 80%, still more preferably at least 100%, and most preferably a peak tensile elongation of at least 120%, as measured by ASTM D-5035, at a fabric weight of from 21 to 26 g/m². Such non-woven fabrics will exhibit a desirable combination of processability (e.g., high melt spinning speeds of at least 4000 meters/minute at a melt temperature of 220° C.) and improved "drape" when manufactured into nonwoven articles or nonwoven components of articles such as diapers, disposable medical products, e.g., hospital gowns, and personal hygiene products, e.g., sanitary napkins.

In a preferred embodiment, the nonwoven fabric of the present invention has a relatively low tensile strength of less than 750 g/cm, as measured by ASTM D-5035. It is preferred that the nonwoven fabric's tensile strength be less than 700 g/cm, even more preferred if the tensile strength is less than 600 g/cm, and most preferred if the tensile strength is about 350 g/cm.

EXAMPLES

The following Examples are intended to illustrate specific embodiments of the present invention, and are not to be construed to limit the permissible scope of the invention in any manner whatsoever.

Example I

Polyolefin compositions were converted into spunbond fabric samples having a fabric weight of 25 grams/m² using a Reifenhauser II spunbond machine. The homopolymers were extruded at 450° F., while the polyolefin compositions were extruded at 415° F. Fabric prepared from the homopolymers was bonded at 270° F., while fabric prepared from the polyolefin compositions was bonded at 250° F. Fabric testing was performed according to ATSM D-5035, Strip Tensile, using 1×6 inch samples and a crosshead speed of 12 inches/minute. Five specimens were tested per sample to arrive at average fabric elongation and tensile strength.

TABLE 1

| Sample | Comp. | MFR | Visbroken | P.I. | Fiber | CD Tens. | CD Elong |
|---|---|---|---|---|---|---|---|
| I-1 | 100% PP | 35 | Yes | 2.3 | 17.3 | 750 | 77% |
| I-2 | 100% PP | 35 | No | 3.6 | 17.9 | 688 | 98% |
| I-3 | 80% I-1 | 65 | Blend | 3.7 | 17.5 | 623 | 80% |
| I-4 | 100% | 35 | Yes | 2.1 | 17.8 | 596 | 54% |
| I-5 | 100% | 38 | No | 3.4 | 22.4 | 615 | 80% |
| I-6 | 100% | 53 | No | 3.3 | 21.5 | 604 | 77% |
| I-7 | 80% I- | 53 | No | 3.6 | 16.9 | 583 | 157% |

*Homopolymer of propylene having an as polymerized MFR of 400, commercially available from Montell USA Inc.

Several observations can be taken from Table I:

1. Sample I-4 (a visbroken random propylene/ethylene copolymer having a MFR of 35 g/10 min) produced a nonwoven fabric having a lower peak elongation than nonwoven fabric produced from sample I-1 (a visbroken propylene homopolymer having a MFR of 35 g/10 min).

2. Sample I-5 (a random copolymer having an as polymerized MFR of 38 g/10 min.) produces poorly formed nonwoven fabric having coarse hand and a peak elongation comparable to visbroken propylene homopolymer having a MFR of 35 g/10 min (sample I-1).

3. Sample I-2 (a propylene homopolymer having an as polymerized MFR of 35 g/10 min.) produced a nonwoven fabric having a peak elongation superior to that of sample I-1 (propylene homopolymer visbroken to a MFR of 35 g/10 min.)

4. Sample I-7 (a polyolefin composition of the present invention) produced a non-woven fabric having a clearly superior peak elongation.

Example II

Polyolefin compositions were prepared and formed into non-woven fabrics using the general procedures of Example 1 but using different equipment. The fabric produced had a fabric weight of 22 g/m². Sample descriptions are set forth in Table 2, sample characteristics are set forth in Table 3, and sample elongation and tensile strengths are reported in Table 4.

TABLE 2

Sample Description

| Sample No. | Description | MFR |
|---|---|---|
| II-1 | propylene homopolymer | 35 |
| II-2 | random copolymer[1] | 38 |
| II-3 | random copolymer[2] | 52 |
| II-4 | 80% II-2 + 20% propylene homopolymer[3] | 60 |
| II-5 | 80% II-2 + 10% propylene homopolymer[2] | 44 |
| II-6 | 63% random copolymer[4] 37% propylene homopolymer[2] | 39 |

[1]Random copolymer of propylene and ethylene having 3 wt. % ethylene.
[2]Random copolymer of propylene and ethylene having 3 wt. % ethylene.
[3]Propylene homopolymer having an as-polymerized MFR of 400 g/10 min which is commercially available from Montell USA Inc.
[4]Propylene-ethylene random copolymer having 3 weight percent ethylene and a MFR of 10 g/10 min, which is commercially available from Montell USA Inc.

TABLE 3

Sample Characteristics

| Sample No. | Max Spin Speed m/min. | P.I. |
|---|---|---|
| II-1 | 4950 | 2.24 |
| II-2 | 4580 | 3.39 |
| II-3 | 5780 | 3.31 |
| II-4 | 4340 | 3.53 |
| II-5 | 4420 | 3.46 |
| II-6 | 3420 | 3.89 |

TABLE 4

Comparison of Maximum Elongation and Corresponding Tensile

| Sample No. | | CD Elongation | MD Elongation | CD Tensile | MD Tensile |
|---|---|---|---|---|---|
| (1) | For | Fiber Size | 16.5 | Microns | |
| | II-1 | 60 | 60 | 1.7 | 3 |
| | II-2 | 85 | 90 | 1.3 | 2.2 |
| | II-3 | 85 | 90 | 1.7 | 2.3 |
| | II-4 | 120 | 90 | 2.3 | 2.5 |
| | II-5 | 100 | 90 | 1.7 | 2.5 |
| | II-6 | 105 | 90 | 1.9 | 2.7 |
| (2) | For | Fiber Size | 19 microns | | |
| | II-1 | 60 | 60 | 1.4 | 2.5 |
| | II-2 | 100 | 75 | 1.4 | 1.8 |
| | II-3 | 110 | 90 | 1.4 | 1.8 |
| | II-4 | 90 | 90 | 1.8 | 1.8 |
| | II-5 | 85 | 85 | 1.4 | 2 |
| | II-6 | 110 | 90 | 1.6 | 2.3 |

The following observations can be drawn from this data:

1. Sample II-4 [a polyolefin composition comprising 20% by weight propylene homopolymer having an as polymerized MFR of 400 g/10 min. and 80% by weight of a random propylene/ethylene copolymer (3% ethylene) having an as polymerized MFR of 38 g/10 min.] produced a nonwoven fabric having the highest fabric elongation among the samples tested.

2. Sample II-6 [a polyolefin composition comprising 37% by weight propylene homopolymer having an as polymerized MFR of 400 g/10 min. and 63% by weight of a random propylene/ethylene copolymer (3% ethylene) having an as polymerized MFR of 10 g/10 min.] produced a nonwoven fabric having peak elongation comparable to Sample II-4. However, sample II-6 was more difficult to spin at a 16.5 micron fiber diameter than sample II-4.

What is claimed is:

1. A polyolefin composition comprising:
   A. 45 to 5 weight percent of a low viscosity propylene homopolymer having an as polymerized melt flow rate of from 250 to 550 g/10 minutes: and
   B. 55 to 95 weight percent of an olefin polymer composition selected from the group consisting of
      (1) a random copolymer of propylene and ethylene and/or a $C_{4-10}$ alpha-olefin, with the copolymer containing from 90 to 99 weight percent propylene;
      (2) a propylene polymer composition consisting essentially of:
         (a) from 30 to 65% of a copolymer of propylene with a $C_{4-8}$ alpha-olefin, which contains from 80 to 98% propylene, and
         (b) from about 35 to 70% of a copolymer of propylene with ethylene having an ethylene content of from 1 to 10% or a terpolymer of propylene with ethylene and a $C_{4-8}$ alpha-olefin having a total comonomer content is from 2 to 10%;
      (3) an olefin polymer composition consisting essentially of:
         (a) from 10 to 50% of a propylene homopolymer having an isotactic index of from 80 to greater than 99%, or a copolymer selected from the group consisting of (i) propylene and ethylene, (ii) propylene, ethylene and a $CH_2$=CHR alpha-olefin, where R is a $C_{2-8}$ straight or branched alkyl, and (iii) propylene and a $CH_2$=CHR alpha-olefin, where R is a $C_{2-8}$ straight or branched alkyl, wherein said copolymer contains from 85 to 99% propylene, and having an isotactic index greater than 80 to 98%,
         (b) from 5 to 20% of a semi-crystalline, essentially linear copolymer fraction having a crystallinity of about 20 to 60%, by differential scanning calorimetry (DSC), wherein the copolymer is selected from the group-consisting of (i) ethylene and propylene containing over 55% ethylene; (ii) ethylene, propylene, and a $CH_2$=CHR alpha-olefin, where R is a $C_{2-8}$ straight or branched alkyl, containing from 1 to 10% of the alpha-olefin and over 55% up to 98% of both ethylene and alpha-olefin; and (iii) ethylene and a $CH_2$=CHR alpha-olefin, where R is a $C_{2-8}$ straight or branched alkyl, containing over 55% up to 98% of said alpha-olefin, which copolymer is insoluble in xylene at room or ambient temperature, and
         (c) from 40 to 80% of a copolymer fraction selected from the group consisting of a copolymer of (i) ethylene and propylene wherein the copolymer contains from 20% to less than 40% ethylene; (ii) ethylene, propylene, and a $CH_2$=CHR alpha-olefin, where R is a $C_{2-8}$ straight or branched alkyl, wherein the alpha-olefin is present in an amount of from 1 to 10% and the amount of ethylene and alpha-olefin present is from 20% to less than 40%; and (iii) ethylene and a $CH_2$=CHR alpha-olefin, where R is a $C_{2-8}$ straight or branched alkyl, containing from 20 to less than 40% of the alpha-olefin, and optionally with 0.5 to 10% of a diene, said copolymer fraction being soluble in xylene at ambient temperature and having an intrinsic viscosity of from 1.7 to 3.0 dl/g, wherein the total amount of ethylene units or said alpha-olefin units in the olefin polymer composition, or of ethylene and said alpha-olefin units when both are present in the olefin polymer composition is from 15 to 35%, the total amount of (b) and (c) fractions, based on the total olefin polymer composition is from about 65% to 80%, the weight ratio of (b)/(c) is from 0.1 to about 0.3 and the total content of ethylene or $C_{4-8}$ alpha-olefin or combination thereof in (b+c) is less than 50%;
      (4) a thermoplastic olefin consisting essentially of:
         (a) from 10 to 60% of a propylene homopolymer having an isotactic index greater than 90 or a crystalline propylene copolymer with ethylene and/or $C_{4-8}$ alpha-olefin having a propylene content greater than 85% and an isotactic index of greater than 85%;
         (b) from 30 to 60% of an amorphous ethylene-propylene copolymer fraction, optionally containing a minor amount of a diene, which is xylene soluble at room temperature, and contains from 40 to 70% ethylene;
         (c) from 8 to 40% of a semi-crystalline ethylene-propylene copolymer which is xylene insoluble at room temperature; and
      (5) a linear low density polyethylene containing up to 20%, by weight, of a $C_{4-8}$ α-olefin having a density of from 0.88 to 0.945 g/cm³ and a melt index of from 0.1 to 35 g/10 min;
      (6) a high melt strength propylene polymer having a branching index of less than 0.9 or a melt tension of 3 to 28 cN; and
      (7) mixtures thereof.

2. The polyolefin composition of claim 1, wherein said olefin polymer composition is B(1).

3. The polyolefin composition of claim 2, wherein said composition contains from 40 to 5 weight percent of component A and from 60 to 95 weight percent of component B.

4. The polyolefin composition of claim 2, wherein B(1) has a melt flow rate of at least 10 g/10 minutes.

5. The polyolefin composition of claim 1, wherein said, low viscosity propylene homopolymer has a melt flow rate of from 350 to 450 g/10 minutes.

6. The polyolefin composition of claim 1, wherein the composition has a melt flow rate of 20 to 70 g/10 minutes.

7. The polyolefin composition of claim 1, wherein a polydispersity index of said composition is from 3.0 to 4.5.

* * * * *